United States Patent [19]

Nilsen

[11] Patent Number: 4,497,995
[45] Date of Patent: Feb. 5, 1985

[54] APPARATUS FOR CONTINUOUSLY ADVANCING AND WELDING METAL CAN BODIES AND THE LIKE

[75] Inventor: Carl J. Nilsen, Hopatcong, N.J.

[73] Assignee: SWS Incorporated, Landing, N.J.

[21] Appl. No.: 368,869

[22] Filed: Apr. 15, 1982

[51] Int. Cl.³ .............................................. B23K 27/00
[52] U.S. Cl. ........................ 219/121 LC; 219/121 LY
[58] Field of Search ............... 219/121 LC, 121 LD, 219/121 LY, 121 EC, 121 ED, 121 EX, 61.3, 219/64; 228/17, 17.5

[56] References Cited

U.S. PATENT DOCUMENTS

| | | | |
|---|---|---|---|
| 2,052,380 | 8/1936 | Chapman | 219/64 |
| 2,322,221 | 6/1943 | Cereghino | 219/64 X |
| 2,517,574 | 8/1950 | Jones et al. | 219/64 |
| 3,834,010 | 9/1974 | Wolfe et al. | 219/64 X |
| 4,152,573 | 5/1979 | Saurin et al. | 219/121 LD |
| 4,272,004 | 6/1981 | Nilsen | 228/17.5 |
| 4,399,343 | 8/1983 | Muller et al. | 219/64 |

Primary Examiner—C. L. Albritton
Attorney, Agent, or Firm—Antonelli, Terry & Wands

[57] ABSTRACT

An apparatus is disclosed for continuously forming and laser welding metal can bodies and the like. The apparatus comprises a former for successively forming flat sheets of metal into generally tubular shaped sheets of metal having longitudinally extending edges to be welded, an indexer for successively advancing the generally tubular shaped sheets of metal from the former to a first position in a direction toward a laser welding device such that the generally tubular shaped sheets of metal are moving at a predetermined speed at the first position, an additional advancing device including a pair of endless metal belts extending between the first position and a second position, the belts having a plurality of fingers mounted thereon in spaced relationship for engaging the trailing ends of successive generally tubular shaped sheets of metal to advance the sheets from the first position to the second position at a substantially constant speed, and a laser welding device arranged for welding the longitudinally extending edges of the generally tubular shaped sheets of metal as they are advanced between the first and second positions.

50 Claims, 21 Drawing Figures

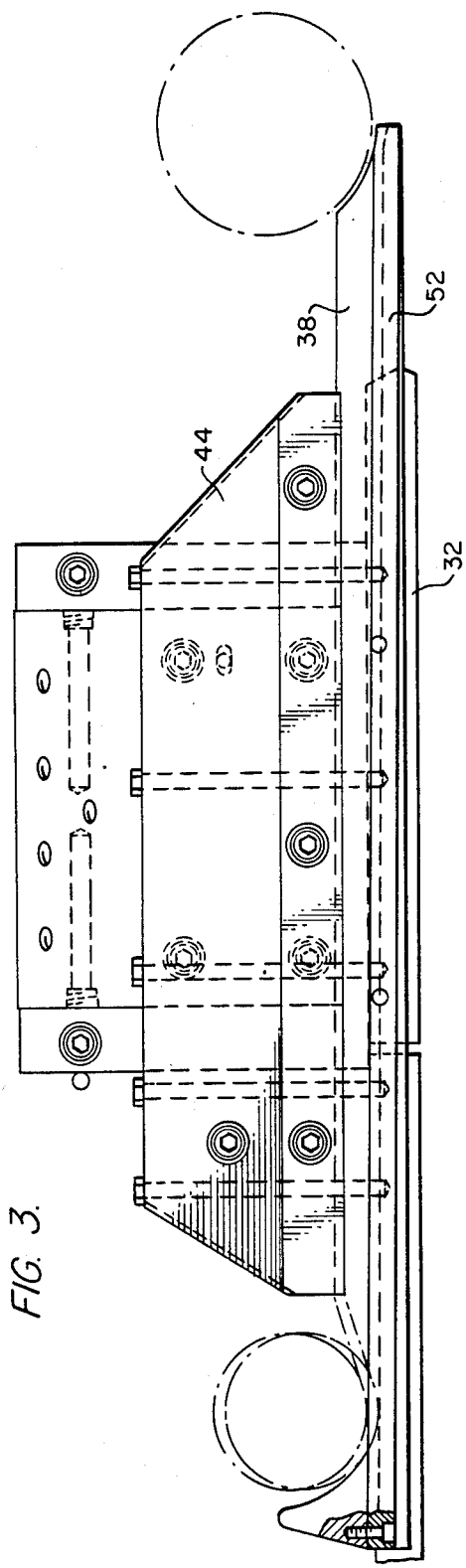
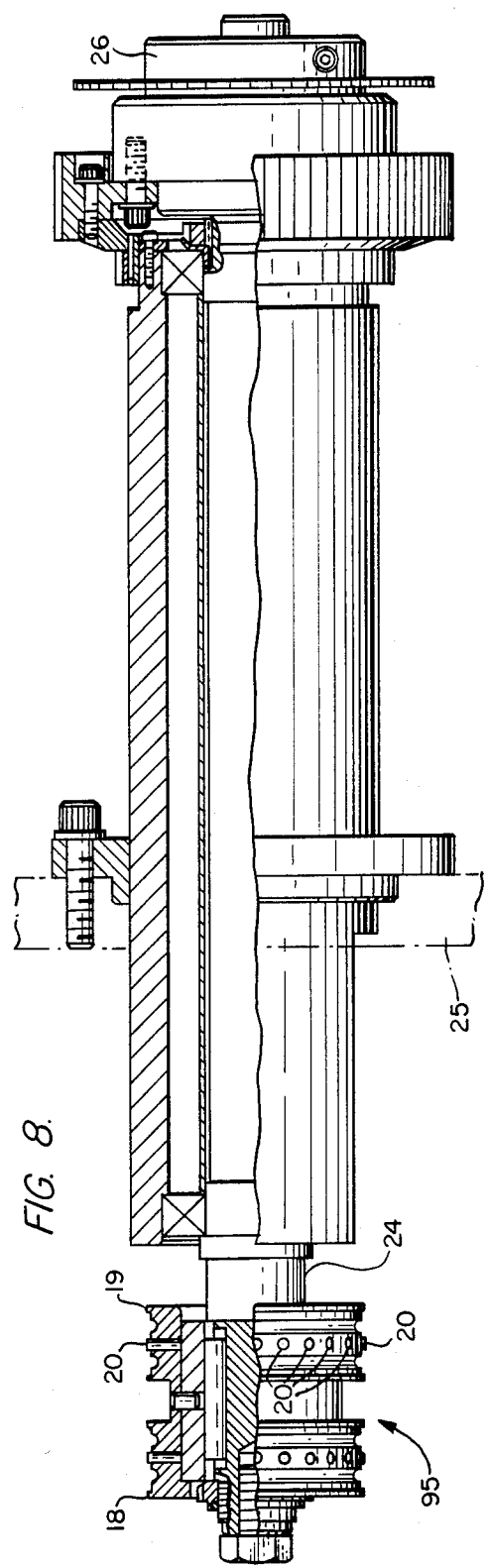
FIG. 3.
FIG. 8.

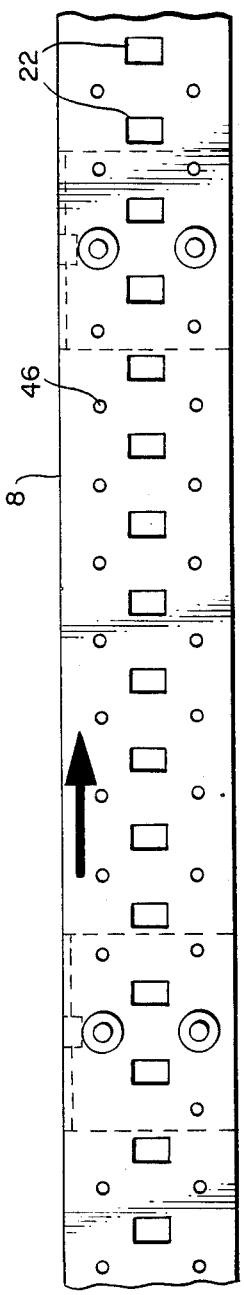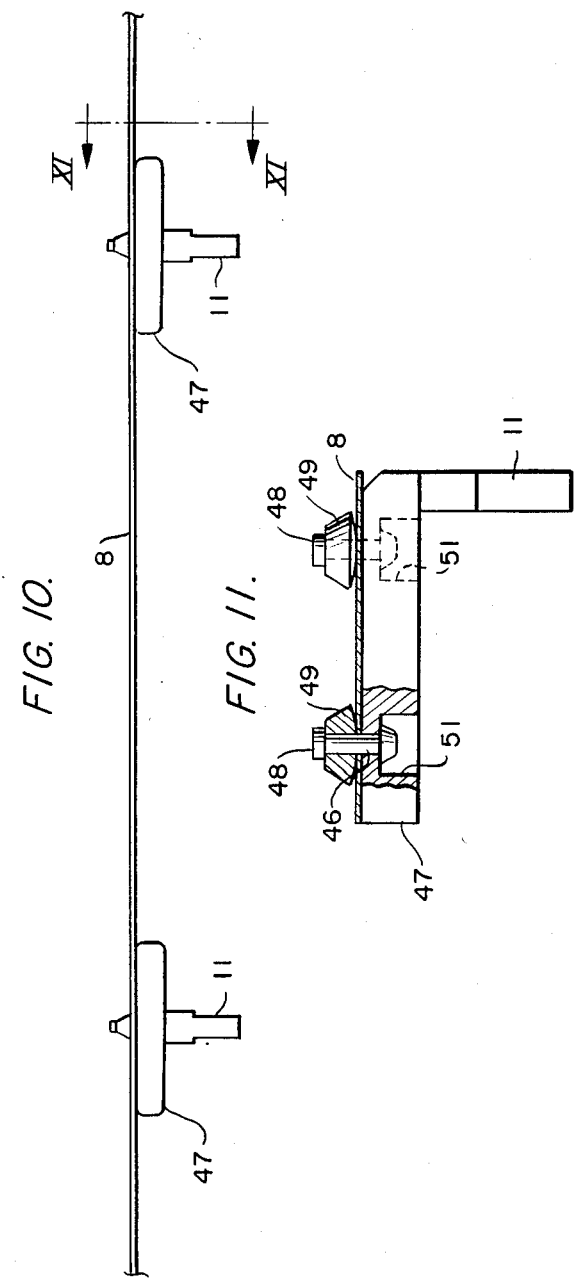

APPARATUS FOR CONTINUOUSLY ADVANCING AND WELDING METAL CAN BODIES AND THE LIKE

CROSS-REFERENCES TO RELATED INVENTIONS

Reference is made to applicant's prior copending U.S. application Ser. No. 233,251 filed Feb. 10, 1981 now U.S. Pat. No. 4,354,090 issued Oct. 12, 1982 titled Z-Bar Guide Apparatus and Method of Butt Welding which is a continuation-in-part application of applicant's earlier U.S. application Ser. No. 88,197, now U.S. Pat. No. 4,272,004 issued June 9, 1981 titled Z-Bar Guide Apparatus. The disclosures of these patents are incorporated herein by reference.

BACKGROUND AND SUMMARY OF THE INVENTION

The present invention relates to an apparatus for continuously advancing and welding metal can bodies and the like and, more particularly, to an apparatus for continuously forming and laser welding metal can bodies.

The applicability of laser welding for fabricating can bodies is known. For example, in U.S. Pat. No. 4,152,573 to Saurin, et al., a method and apparatus for laser welding metal can bodies are disclosed. The article "The Laser Welding Of Steels Used In Can Making" by J. Mazumder and W. M. Steen, Welding Journal, June, 1981, pages 19–25, also discusses the advantages of laser welding in can making. However, the apparatus disclosed in these references for advancing and welding metal can bodies are not suitable for the type of continuous, high-speed operation necessary for production in most commercial applications. In particular, in each of these references the can body or metal being welded is fixedly clamped on both sides of the weld joint area by clamping bars of a vise or fixture. During welding the vise or fixture and the can body or metal sheet clamped therein are advanced relative to a laser welding device to accomplish the welding. Thus, with these known apparatus an individual metal sheet to be welded must be first clamped, then welded, and thereafter unclamped from the vise or fixture before a second metal sheet can be processed. Such an apparatus is not suitable for commercial applications where continuous, high rates of production, such as 400–600 cans per minute, are necessary or desirable.

The Z-bar guide apparatus disclosed in applicant's aforementioned U.S. Pat. Nos. 4,272,004 and 4,354,090 make it possible to position and guide the opposed edges of generally tubular shaped sheets of metal so that the sheets of metal may be continuously advanced and lap or butt welded to produce metal can bodies. To accomplish this a means for advancing the sheet material along the can forming machine through the Z-bar and past the welding station, must be provided. As indicated in the aforesaid patents, depending upon the type of conventional welder involved, conventional chain type conveyors, drive rollers, reciprocating pistons or push rods or the like may be used to advance the sheet material. However, it has been found that these conventional advancing mechanisms may be problematical or not applicable, especially in the case of continuous high-speed laser, electron beam or other noncontact welding of the metal can bodies. For example, with the use of conventional chain type conveyors having chains with fingers or dogs for engaging the metal sheets, there may be problems in accurately aligning the opposed edges of a metal sheet in the longitudinal direction, particularly at the high speeds possible when laser welding due to chain vibration and stretching of the chain because of the numerous joints and tolerances associated with such joints. A slight misalignment of the welded edges can result in difficulty in joining the ends of the can to the tubular metal body and/or possible leakage of the can in this area once the ends have been joined to the can body.

The conventional apparatus for advancing and welding metal can bodies may also be problematical where they require frequent starting and stopping of the can bodies as they are advanced along the machine to permit various operations such as, crimping of joints to be soldered. Where the metal can bodies are to be electrical resistance welded, the conventional apparatus may provide a high speed acceleration of the can bodies near the welding rollers to close the gaps between successive can bodies as they enter the nip of the resistance welding rollers thereby preventing the rollers from contacting each other. These abrupt changes in motion, e.g. starting and stopping or fluctuating the speed of the advancing can bodies immediately before welding may be problematical in that they require additional time for processing of the can bodies and/or can lead to jamming of the apparatus and the consequent time and expense associated with alleviating such a condition.

An object of the present invention is to provide an apparatus for continuously advancing and welding metal can bodies and the like which avoids the aforementioned disadvantages of the conventional apparatus. More particularly, an object of the present invention is to provide an apparatus for continuously forming and laser welding metal can bodies which is suitable for high-speed production, which advances successive generally tubular shaped sheets of metal so as to accurately align the opposed edges in the longitudinal direction, and which does so in a relatively smooth and efficient manner to minimize jamming problems and allow continuous welding with constant speed and constant power requirements.

These and other objects of the invention are attained by providing an apparatus for continuously forming and laser welding metal can bodies comprising forming means for successively forming flat sheets of metal into generally tubular shaped sheets of metal having longitudinally extending edges to be welded, advancing means for successively advancing the generally tubular shaped sheets of metal from the forming means to a first position in a direction toward a laser welding means such that the generally tubular shaped sheets of metal are moving at a predetermined speed at the first position, additional advancing means for continuously advancing the successive moving generally tubular shaped sheets of metal from the first position to a second position at a substantially constant speed, and laser welding means arranged for welding the longitudinally extending edges of the generally tubular shaped sheets of metal as they are advanced by the additional advancing means.

According to a disclosed, preferred embodiment of the apparatus of the invention, the additional advancing means includes a pair of endless metal belts extending between the first and second positions, each of the belts having a plurality of fingers mounted thereon in spaced relationship for engaging the trailing ends of successive generally tubular shaped sheets of metal to advance the sheets.

Means are provided for arranging the pair of metal belts in spaced relationship on opposite sides of the longitudinally extending edges to be welded. This means for arranging the metal belts includes guide roll means and drive sprocket means for supporting and driving the respective belts in spaced relationship, the drive sprocket means being provided with a plurality of teeth on their outer surfaces for drivingly engaging in a series of holes formed in the respective belts. According to one form of the invention the holes formed in the belts are rectangular in shape and the driving faces of the teeth on the driving sprocket means are flat for engaging a side of the rectangular holes to drive the belts. The apparatus also includes means for resiliently biasing at least one guide roll means supporting each belt to tension the belts.

The guide roll means and drive sprocket means support the metal belts in spaced relationship so that they move between the first and second positions in paths parallel to the paths of the respective portions of the successive sheets of metal which are engaged by the fingers on the belts. This reduces the wear on the fingers and damage to the sheet ends which would otherwise be caused by the transverse sliding of the fingers with respect to the trailing ends of the metal sheets.

Guide bar means are provided under each metal belt between the guide roll means and the driving sprocket means to prevent vibrations and vertical movement of the belts during operation of the apparatus. The guide bar means between the drive sprocket means and the adjacent guide roll means on the downstream side of the drive sprocket means includes stripper means adjacent the drive sprocket means for stripping the metal belts off the drive sprocket means. According to a preferred form of the invention the stripper means are knife edges formed of a wear resistant material.

The metal belts are preferably formed of stainless steel and have a thickness of from 0.005 to 0.020 inch. The fingers are connected to respective base plates and connecting means are provided for connecting the respective base plates to the metal belts. The connecting means connect each of the base plates to the belts along a single line along the length of the base plates which extends in a direction perpendicular to the direction of movement of the belts. This permits the base plates with fingers to move about the curved surfaces of the guide roll means and drive sprocket means without unduly stressing the belts. The connecting means according to a preferred form of the invention are rivets having caps which engage the belts. The surfaces of the rivet caps in contact with the belts are arcuate so that the base plates may pivot or rotate about the single line of connection with the belts during their movement about the guide roll means and the drive sprocket means.

The base plates of the fingers are formed within close tolerances to the same predetermined length and thickness before they are connected to the metal belts. In addition, guide bar means are provided for supporting the outer surfaces of the base plates as they advance the generally tubular shaped metal bodies between the first and second positions. These measures ensure that any canting or tilting of the base plates on the belts in response to stresses applied to the respective fingers in advancing the sheets of metal, is uniform thereby maintaining the precise longitudinal alignment of the opposed edges to be welded. The accuracy of the longitudinal positioning of the opposed edges to be welded is also enhanced according to the present invention in that the surfaces of the fingers on the belts which cooperate to engage the trailing end of a generally tubular shaped sheet of metal and advance the same are match-machined with respect to each other either before or after the base plates thereof have been connected on the belts. In a preferred form of the invention the fingers are formed of investment cast tool steel.

According to a further feature of the invention the advancing means for successively advancing the generally tubular shaped sheets of metal from a forming means to a first position in a direction toward a laser welding means includes indexing means for repeatedly moving successive generally tubular shaped sheets of metal over at least the distance between the forming means and the first position. The indexing means in one form of the invention includes a cam indexer. According to another form of the invention the indexing means includes a D.C. servomotor.

As an additional feature, the advancing means comprises a pair of endless chains extending between the forming means and the first position, each of the chains having a plurality of fingers mounted thereon for engaging the respective trailing ends of successive generally tubular shaped metal sheets to advance the sheets. The chains are arranged in spaced relationship on opposite sides of the generally tubular shaped sheets of metal and extend about respective drive sprockets and idler sprockets.

The apparatus further includes means for adjusting the distance between the respective drive sprockets and the distance between the respective idler sprockets. Means are also provided for adjusting the distance between the forming means and the idler and drive sprockets. These features permit the apparatus to be adjusted to advance and weld a wide range of sizes of generally tubular shaped sheets of metal. In this regard, as another feature of the invention, means are provided for adjusting the position of the forming means with respect to the advancing means so that the trailing ends of the generally tubular shaped sheets of metal may be positioned at the same location along the advancing means with a change in the length or height of the sheet metal or can body.

Thus, as a result of the invention an apparatus is provided for continuously advancing and welding metal can bodies and the like at high speeds with improved accuracy of alignment of the longitudinal edges to be welded. Moreover, the apparatus of the invention can be used to advance and weld a great variety of cans with wide ranging can diameters and heights. Further, with the apparatus of the invention the can bodies are moved by means of the indexing means from the forming means to a first position in a direction toward a welding means such that they are moving at a predetermined speed at the first position and thereafter the additional advancing means permits the successive shaped sheets of metal to be continuously advanced to a second position at a substantially constant speed for laser welding thereby reducing the likelihood of jamming of the apparatus and permitting relatively high production rates.

These and other objects, features and advantages of the present invention will become more apparent from the following description when taken in connection with the accompanying drawings which show, for purposes of illustration only, one preferred embodiment in accordance with the present invention.

BRIEF DESCRIPTION OF THE DRAWINGS

FIG. 3 is a detailed side view of the Z-bar support assembly illustrated generally in FIG. 2;

FIG. 8 is a partial cross sectional view of the drive sprocket and its supporting shaft taken along the line VIII—VIII in FIG. 2;

FIG. 9 is a plan view of a portion of a preferred form of metal belt for the apparatus of the invention;

FIG. 10 is a front view of the metal belt shown in FIG. 9;

FIG. 11 is a cross sectional view of the metal belt of FIG. 10 taken along the line XII—XII and illustrating the manner of attachment of a base plate with finger to the belt;

DETAILED DESCRIPTION OF THE INVENTION

Figure 1:
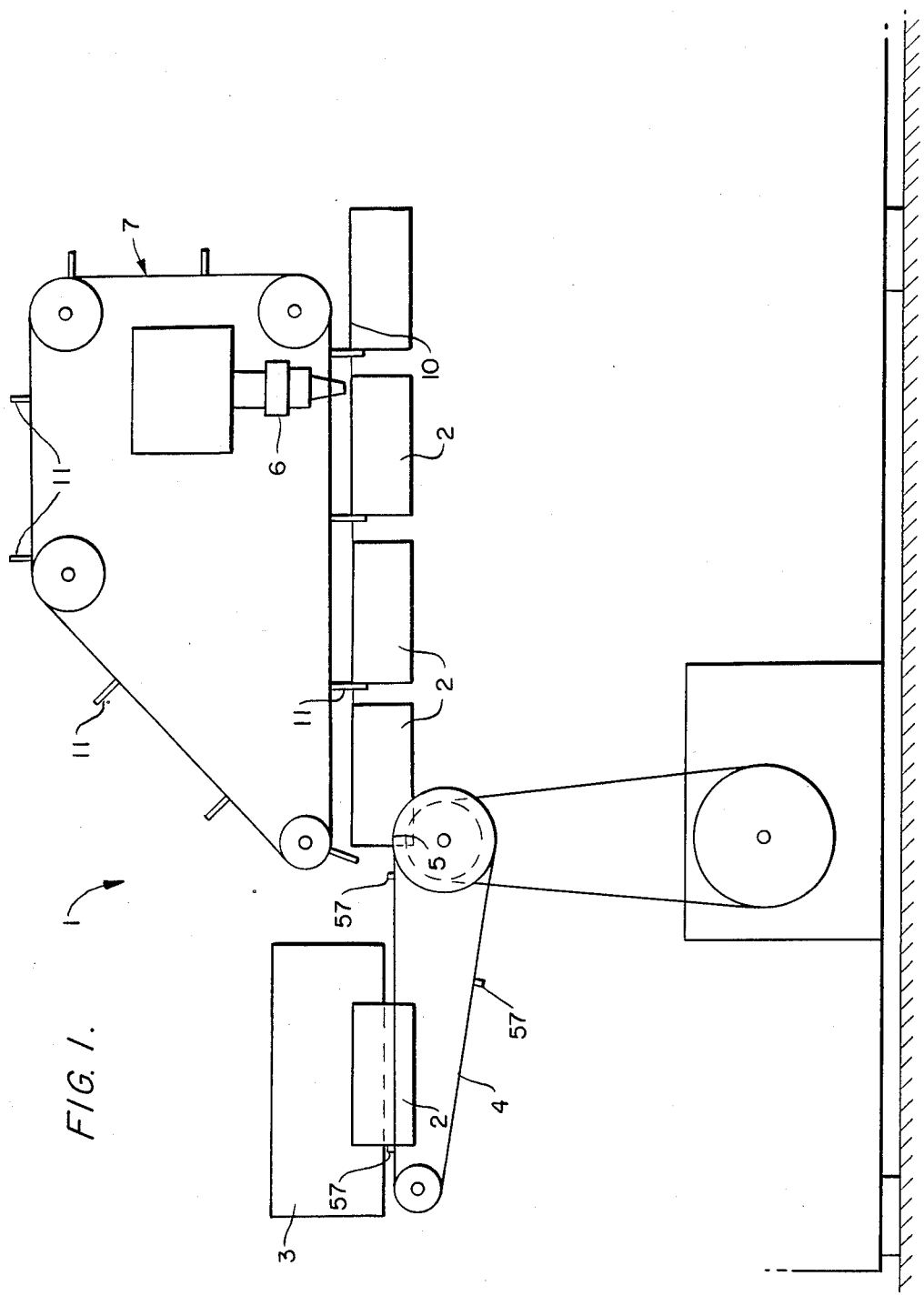
FIG. 1 is a schematic front side view of an apparatus according to the invention for continuously forming and laser welding metal can bodies.

Referring now to the drawings, FIG. 1 schematically illustrates an apparatus 1 according to the invention for continuously forming and laser welding metal can bodies. The apparatus comprises forming means, in this case a conventional roll former 3, for successively forming flat sheets of metal into generally cylindrical tubular shaped sheets of metal 2 having longitudinally extending edges to be welded. A forming means could also be used which provides generally tubular shaped sheets of metal with cross sections other than round, such as square, for example. An advancing means 4 successively advances the generally tubular shaped sheets of metal from the roll former 3 to a first position 5 in a direction toward a laser welding apparatus 6 such that the generally tubular shaped sheets of metal 2 are moving at a predetermined speed at the first position 5. An additional advancing means 7 is provided for continuously advancing the successive moving, generally tubular shaped sheets of metal from the first position 5 to a second position 10 at a substantially constant speed. The laser welding apparatus 6, a conventional 2 kw gas laser, for example, is arranged for welding the longitudinally extending edges of the generally tubular shaped sheets of metal 2 as they are advanced by the additional advancing means 7.

Figure 4:
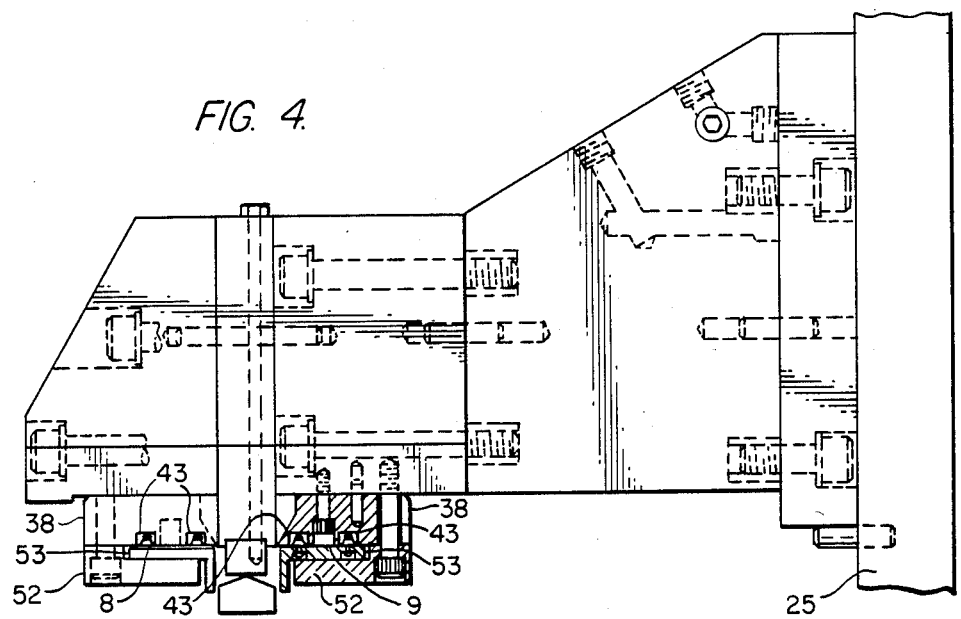
FIG. 4 is a right end view, partially in cross section, of the Z-bar support assembly of FIG. 3.
Figure 5:
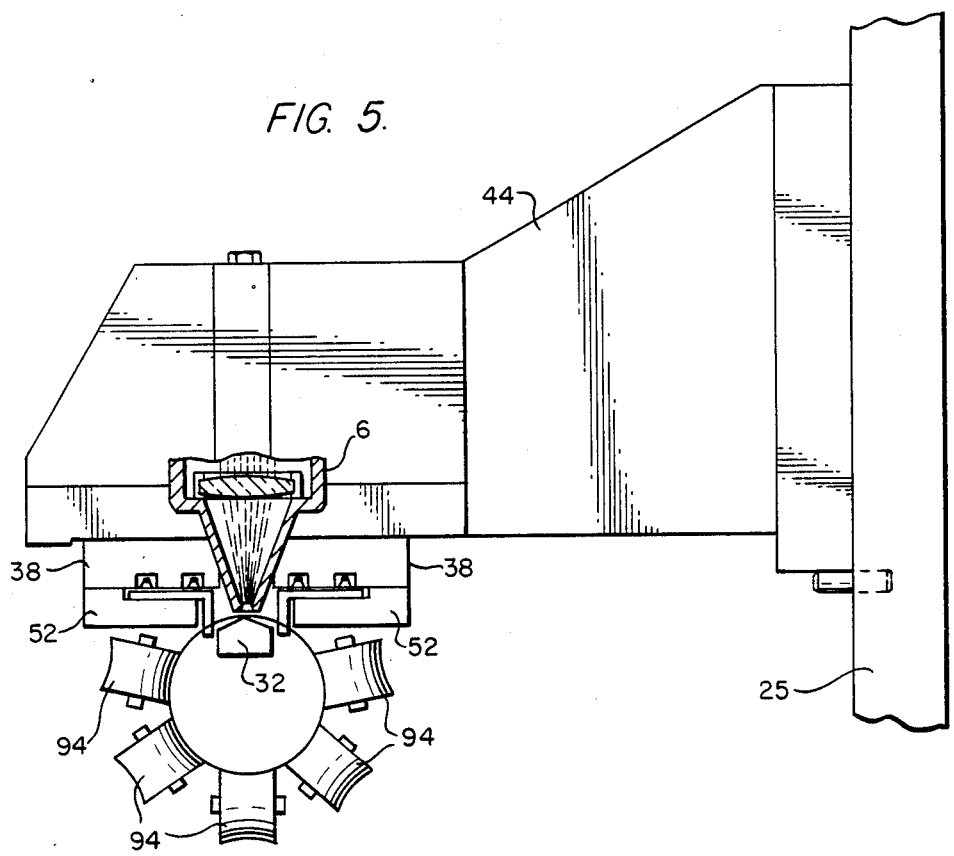
FIG. 5 is an end view of the Z-bar support assembly illustrated in FIG. 4 and further showing the pair of metal belts with fingers, the laser welding apparatus and a plurality of support rolls for a metal can body.
Figure 7:
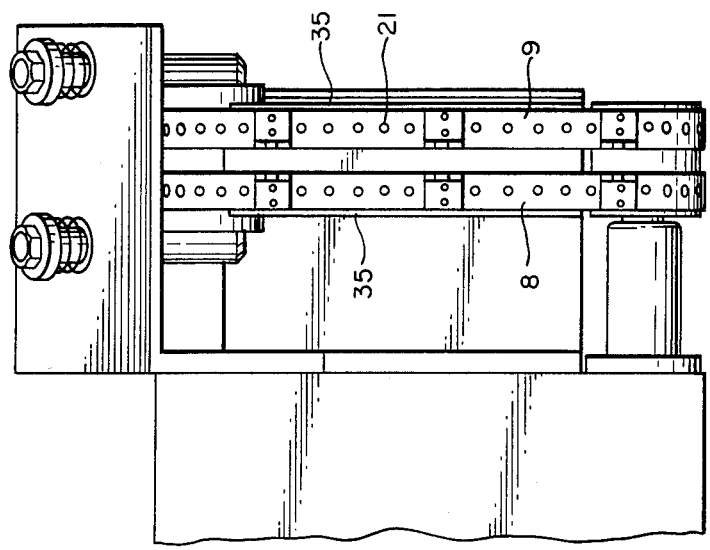
FIG. 7 is a left end view of the apparatus illustrated in FIG. 2 with the metal belts provided about the guide rolls and drive sprocket.
Figure 6:
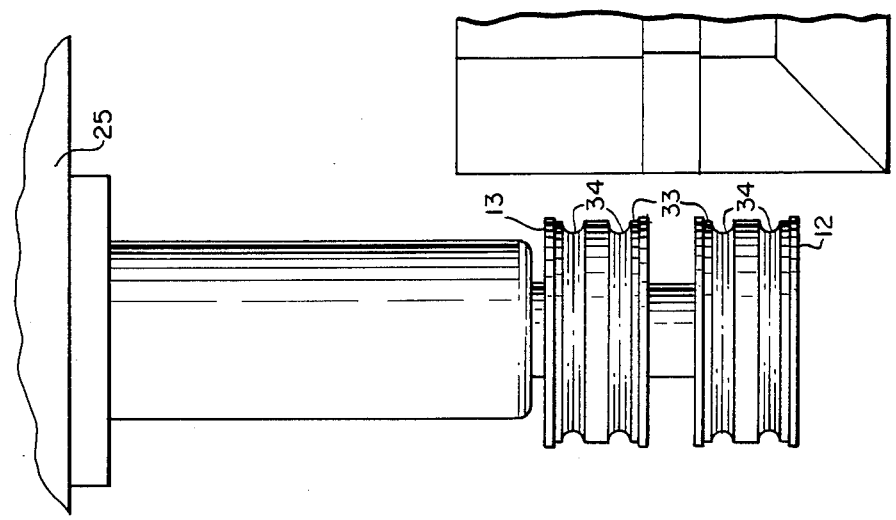
FIG. 6 is a top view of the lower lefthand guide roll shown in FIG. 2.

The additional advancing means 7 according to the invention includes a pair of endless metal belts 8 and 9 as illustrated in FIGS. 4, 5 and 7. The metal belts 8 and 9 extend between the first and second positions 5 and 10 and each of the belts has a plurality of fingers 11 mounted thereon in spaced relationship for engaging the trailing ends of successive generally tubular shaped sheets of metal 2 to advance the sheets.

Figure 12:
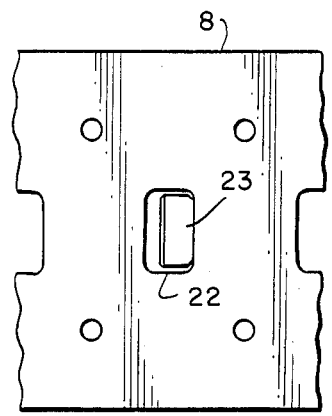
FIG. 12 is an enlarged view of a portion of the metal belt depicted in FIG. 9 and showing a pin or sprocket tooth having a flat face for engaging in the rectangular holes in the belt to drive the same.

The metal belts 8 and 9 are arranged in spaced relationship on opposite sides of the longitudinally extending edges to be welded by means of a plurality of guide rolls 12-17 and a drive sprocket 95 illustrated in FIGS. 1-3, 6 and 8. The driving sprocket 95 includes respective drive sprocket portions 18 and 19. Each of the drive sprocket portions 18 and 19 is provided with a plurality of teeth 20 on its outer surface for drivingly engaging in a series of holes 21 formed in the respective belts. The teeth 20 are formed by the upper portions of pins which are inserted into the respective sprockets in predetermined spaced relationship. As illustrated in FIG. 7, the holes 21 in the belts are circular in shape and the teeth 20 have a complementary shape over the forward portion of the holes. The upper surfaces of the teeth are recessed over the trailing portion of the teeth so as not to interfere with the metal belt during engagement and withdrawal of the teeth from the holes in the belts. Alternatively, according to a preferred form of the invention, the holes formed in the belts for receiving the teeth on the driving sprockets are rectangular in shape as shown at 22 in FIG. 12. In this case the driving face of the teeth 23 on the driving sprocket are flat for engaging the leading flat side of the rectangular holes to drive the belts. By using such cooperating flat surfaces machining is simplified and the necessary accurate positional relationship of the sprocket teeth with respect to the belt holes is more easily obtained. The driving area between the teeth and belts is also greater with the use of such cooperating flat surfaces thereby allowing transmission of higher torque to the belts.

The driving sprocket 95 is supported on a driving shaft 24 in a non-rotatable manner as illustrated in FIG. 8. The driving shaft passes through a tooling plate 25 upon which most of the components of the apparatus 1 are supported. The drive shaft 24 is rotatably driven through an overload clutch 26 in a manner discussed hereinafter.

Figure 2:
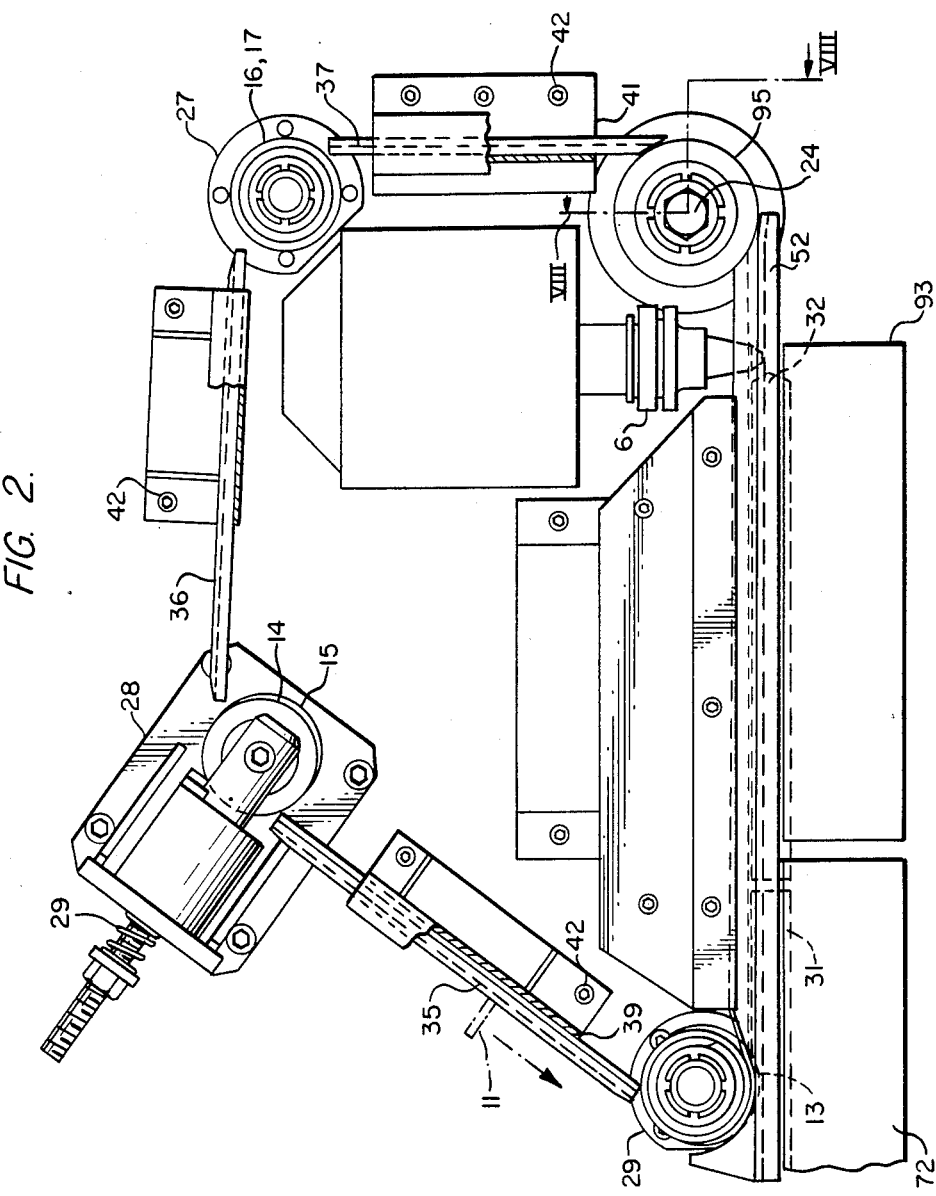
FIG. 2 is a front side view of the belt guides and drive sprocket of the apparatus shown schematically in FIG. 1.
Figure 18:
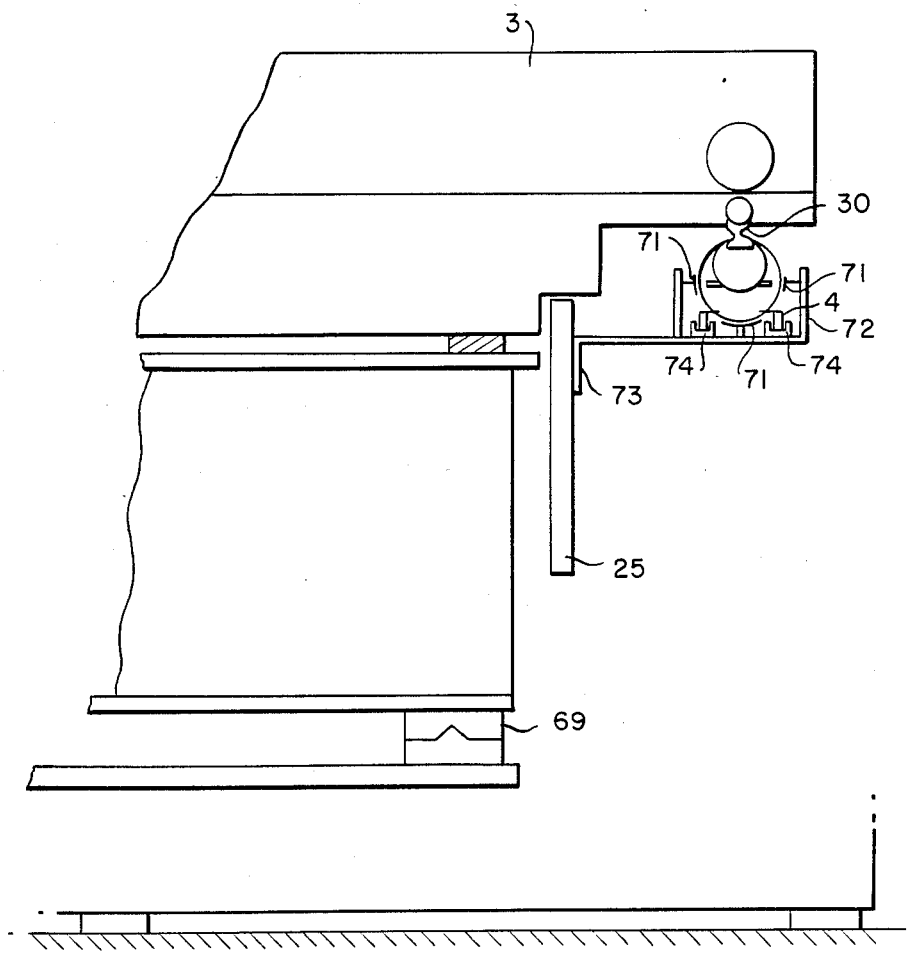
FIG. 18 is a sectional view of the indexer assembly of FIG. 16 taken along the line XVIII-XVIII and illustrating the indexer assembly in relation to the roll former.

The guide rolls 16 and 17 in the upper right of the additional advancing means 7 illustrated in FIG. 2 are rotatably supported in a fixed position by a fixed idler assembly 27. Guide rolls 14 and 15 in the upper left of the additional advancing means 7 are connected to a belt tensioner 28 whose springs 29 resiliently bias the guide rolls in an outward direction to tension the belts 8 and 9. As illustrated in FIG. 2 the guide roll 15 is mounted slightly below and to the right of the guide roll 14 on the belt tensioner 28. The metal belts 8 and 9 are of equal length so that this difference in positional relationship of the guide rolls 14 and 15 permits the guide roll 13 to be positioned slightly below the guide roll 12 in an eccentric idler assembly 29 illustrated in FIG. 2. This results in the belts 8 and 9 being at different heights at the first position 5 or left side of the additional advancing means 7 and converging toward one another gradually along the length of the additional advancing means as they move toward the second position 10 where they are at the same height. Such a spatial relationship of the metal belts takes into account the vertically offset relationship of the opposed edges of the generally tubular shaped sheets of metal as fed from the catch bar 30 of the roll former 3 as shown in FIG. 18.

More particularly, the opposed edges of the generally tubular shaped sheets of metal remain in a vertically offset relationship as they are advanced through the catch bar 30 into an intermediate Z-bar 31 whose guide channels are vertically offset along the entire length thereof. From the intermediate Z-bar 31 the vertically offset edges of the generally tubular shaped sheets of metal 2 are guided into a Z-bar 32 of the type shown in applicant's U.S. Pat. No. 4,272,004, for example. In the Z-bar 32 the vertically offset guide channels converge toward one another along the length of the Z-bar so that the opposed edges of the metal sheet are brought into overlapping or abutting contact with each other in the area of the laser welding apparatus 6 where they are welded to one another. The Z-bars 31 and 32 are supported on the tooling plate 25 by the Z-bar support assembly 44. The paths of the metal belts 8 and 9 between the guide rolls 12 and 13 at the first position 5 and the drive sprockets 18 and 19 at the second position 10 are essentially parallel to the paths of the respective guided edges of the generally tubular shaped sheets of metal 2 from the first position 5 to the second position 10. Therefore, the fingers 11 on the metal belts 8 and 9 remain essentially stationary with respect to the trailing ends of the sheets which they engage so as to reduce or minimize the wear of the fingers 11 and possible canting or deformation of the advancing metal sheets. The fixed idler assembly 27, belt tensioner 28 and eccentric idler assembly 29 are supported on the tooling plate 25 of the apparatus. The configuration of the guide rolls 12–17 can be understood by reference to FIG. 6 wherein the guide rolls 12 and 13 are shown in spaced relationship. Each guide roll is preferably provided with a recess 34 within which a metal belt 8 or 9 is to be received. Two channels 34 are cut into the bottom of each recess 33 for receiving the fasteners, rivets as discussed hereinafter, which connect the metal fingers 11 to the belts.

Respective pairs of guide bars 35–38 are provided under the belts, that is, on the inner side thereof, between the guide rolls and the driving sprocket to support the belts so as to prevent vibrations and vertical movement of the belts while they are driven. The pairs of guide bars 35, 36 and 37 are mounted on L-shaped supporting brackets 39, 40 and 41, respectively which are, in turn, adjustably secured to the tooling plate by suitable fasteners 42 as illustrated in FIG. 2. The pair of guide bars 38 are fastened to a Z-bar support assembly 44 shown in FIGS. 3–5. Each of the guide bars has a supporting surface with two channels formed therein of the type illustrated at 43 in FIGS. 4 and 5 for accommodating the rivets connecting the fingers 11 to the metal belts. The guide bars are preferably formed of a wear resistant material such as a plastic or a metal, for example, aluminum bronze. At least the guide bars 38 are machined in matched sets so as to accurately position the belts 8 and 9 on either side of the Z-bar 32 as shown in FIGS. 4 and 5. The guide bars 37 between the drive sprocket 95 and the adjacent guide rolls 16 and 17 on the downstream side of the drive sprocket include portions 45 which extend to a point immediately adjacent the drive sprocket portions 18 and 19 for stripping the metal belts 8 and 9 off the drive sprocket as they rotate. By forming the guide bars 37, including portions 45, of a wear resistant material, the portions 45 may actually rub against the drive sprocket to strip the belts off the drive sprocket. To minimize the difficulty in separating the metal belts from the drive sprocket, the teeth 20 or 23 on the drive sprocket have a height which is only slightly greater than the belt thickness. As illustrated in FIG. 2, the stripper portions 45 of the guide bars 37 have a knife edge configuration adjacent the driving sprocket which follows the contour of the sprocket.

The continuous metal belts 8 and 9 illustrated in FIGS. 7 and 9–12 are preferably formed from a corrosion resistant stainless steel having a thickness of 0.010 inch and a width of 1.12 to 1.13 inches. A magnetic or a non-magnetic stainless steel may be employed provided the belt material has good flexibility since it must bend around the guide rolls and drive sprocket under tension. During fabrication of the belts, continuous stainless steel strips are punched with holes such as 21 or 22 for receiving the teeth 20 or 23 of the driving sprocket. These holes may be spaced every half inch along the belt, for example. Similarly, a series of smaller, uniformly spaced holes 46 are also punched on each side of the central holes 21 or 22 for fastening the fingers 11 on the belts. The spacing between the holes 46 is the same as the spacing between the central holes 21 or 22 in the illustrated embodiment but may vary depending upon the length of the generally tubular shaped sheets of metal or can bodies to be advanced by the apparatus. Once the desired holes have been punched in the stainless steel strips the ends of the strips are butt welded as by electron beam or laser welding so as to form continuous metal belts. In the disclosed embodiment the overall length of the belts used with the apparatus is between 70 and 75 inches. While the thickness of the metal belts in the disclosed embodiment is 0.010 inch, the belt thickness may vary from 0.005 to 0.020 inch or more. For strength purposes, it is desirable to use the thickest belt possible, but the minimum bending radius of the belts increases with belt thickness to limit the belt thickness that can be used, considering the fatigue life of the belt.

The fingers 11 mounted on the belts 8 and 9 are connected to respective base plates 47. Connecting means in the form of rivets 48 are provided for connecting the respective base plates to the metal belts as depicted in FIGS. 9 and 11, for example. Two rivets 48 are used to connect each base plate 47 to the metal belt in the illustrated embodiment. The holes 46 for the two rivets 48 are arranged along a line extending perpendicular to the direction of movement of the belts. With this arrangement each base plate 47 is connected to the belts at a single line along the length of the belts which extends in a direction perpendicular to the direction of movement of the belts thereby permitting the belts to travel around the guide rolls and drive sprocket while carrying the base plates with fingers without unduly stressing the belts. The ability of the metal belts to move at high speeds around the guide rolls and driving sprocket is also enhanced by using rivets 48 with rivet caps 49 which are formed with arcuate surfaces 50 in contact with the underside of the belts. The upper or outwardly facing sides of the base plates 47 have recesses 51 formed therein for receiving the tops of the rivets 48.

Each of the base plates 47 for the fingers 11 is machined to within close tolerances to the same predetermined length and thickness before it is riveted to a metal belt. The fingers 11 may be integrally formed with the base plates 47 by machining from a solid wrought material, by casting, or by sintering a powdered material such as a powdered carbide material under pressure. One suitable cast metal that may be employed for the fingers 11 and base plates 47 is NIHARD, a high nickel ferrous alloy. A cast tool steel may also be employed. In the disclosed preferred embodiment the fingers 11 and base plates 47 are formed of investment cast tool steel that is machined and heat treated. This material provides an excellent combination of high strength, wear resistance, ease of manufacturing and relatively low cost.

Figure 13:
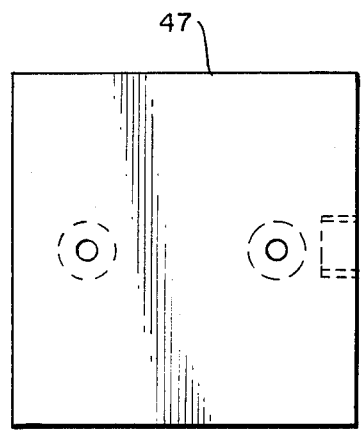
FIG. 13 is a plan view of the bottom or belt engaging surface of a base plate with finger according to the invention.
Figure 14:
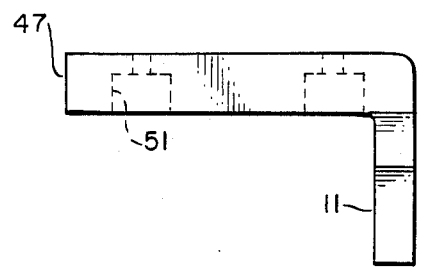
FIG. 14 is a front side view of the base plate with finger illustrated in FIG. 13.
Figure 15:
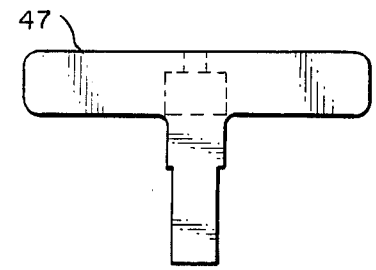
FIG. 15 is a right end view of the base plate with finger as shown in FIG. 14.

Instead of forming the metal fingers 11 integral with the base plates 47 as shown in FIGS. 13-15, the metal fingers 11 may be separately formed and connected to the base plates by brazing, for example. The fingers themselves may also be formed of a composite material including a metal sheet contacting portion of a ceramic material and an adjacent portion of metal, for example. The two portions may be glued or brazed together to form a single finger. A finger having a ceramic portion which contacts the generally tubular shaped sheets of metal is particularly advantageous where it is desired to electrically insulate the additional advancing means 7 from the metal sheet. However, with most laser welding, metal fingers are preferable as compared with ceramic fingers because they reflect light better. In case the additional advancing means 7 of the invention is used to advance generally tubular shaped sheets of metal for resistance welding, the base plates 47 may be a nonmagnetic material and the fingers 11 thereon a hardened, wear resistant material so as to avoid the induction field from the resistance welding process.

In addition to the pairs of guide bars 35-38 provided adjacent the bottom or innerside of the metal belts for supporting the belts during their movement, an additional pair of guide bars 52 are provided for supporting the outer surfaces of the base plates 47 as they advance the generally tubular shaped metal bodies 2 between the first position 5 and the second position 10. The pair of guide bars 52 are illustrated in FIGS. 2, 4 and 5. The guide bars 52 are attached to the pair of guide bars 38 which in turn are carried by the Z-bar support assembly 44 mounted on the tooling plate 25. The guide bars 52 are preferably formed of a wear resistant material such as aluminum bronze. Together the guide bars 38 and guide bars 52 define channels 53 within which the metal belts and base plates 47 are closely confined. The channels 53 are sufficiently large to permit the longitudinal movement of the belts but limit the canting or tilting of the base plates 47 which may occur about the connection line formed by the rivets 48 between the base plates and the metal belts as a result of the forces on the fingers 11 during movement of the generally tubular shaped metal sheets 2. Any canting or tilting of the base plates 47 on the belts about the rivets 48 necessarily changes the longitudinal position of the fingers 11. However, by match machining the dimensions of the guide bars 38, guide bars 52 and the length and thickness of the base plates 47, the permissible tilting or canting of the base plates is the same so that there will be no misalignment introduced as a result of this arrangement. Further, to ensure that the edges of the sheet metal to be welded are precisely longitudinally aligned with respect to each other, the surfaces of the fingers 11 on the belts which cooperate to engage the trailing end of a generally tubular shaped sheet of metal and advance the same are match machined with respect to each other either before or after the base plates thereof have been connected on the belts.

Figure 16:
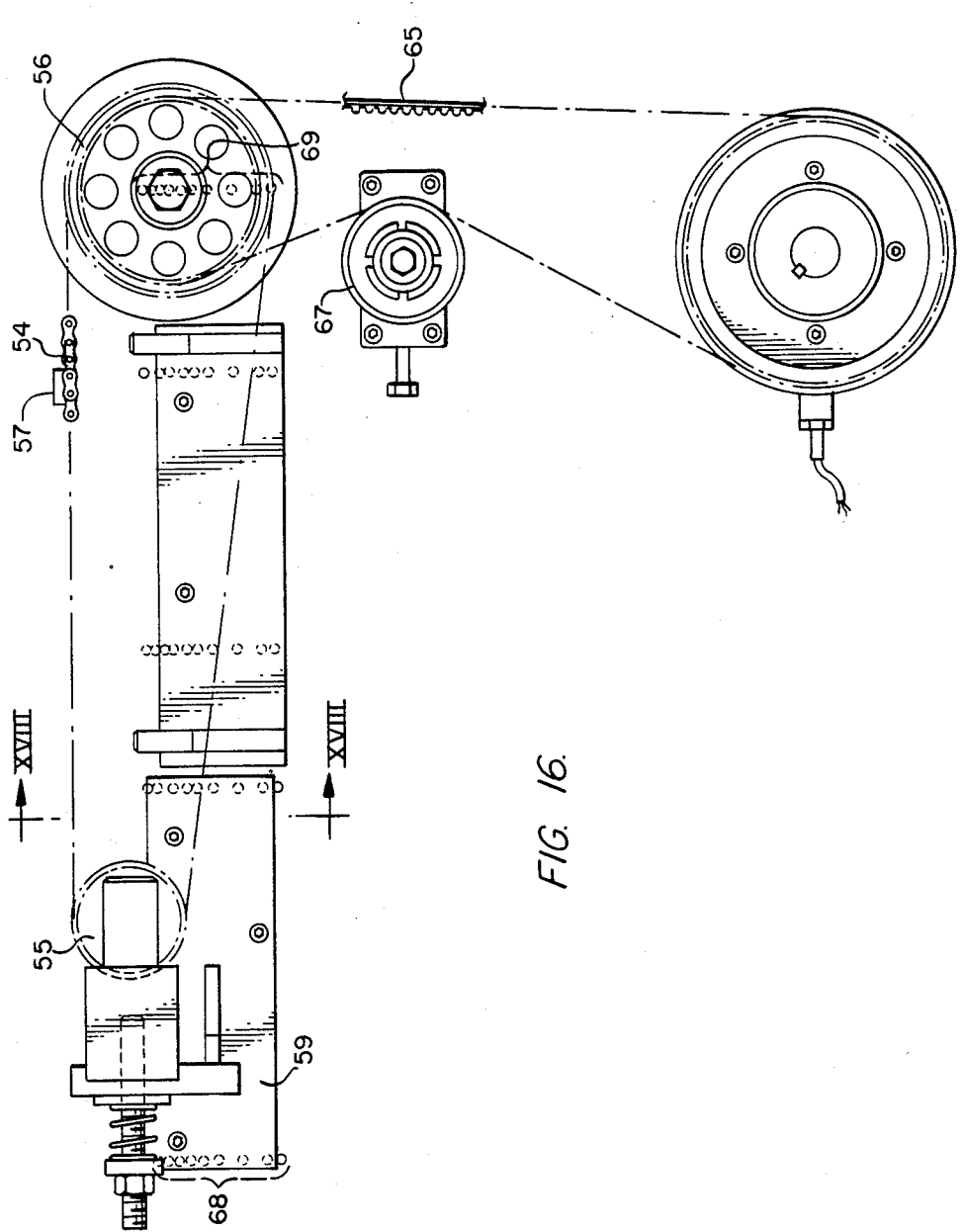
FIG. 16 is a front side view of the indexer assembly illustrated schematically in FIG. 1.
Figure 17:
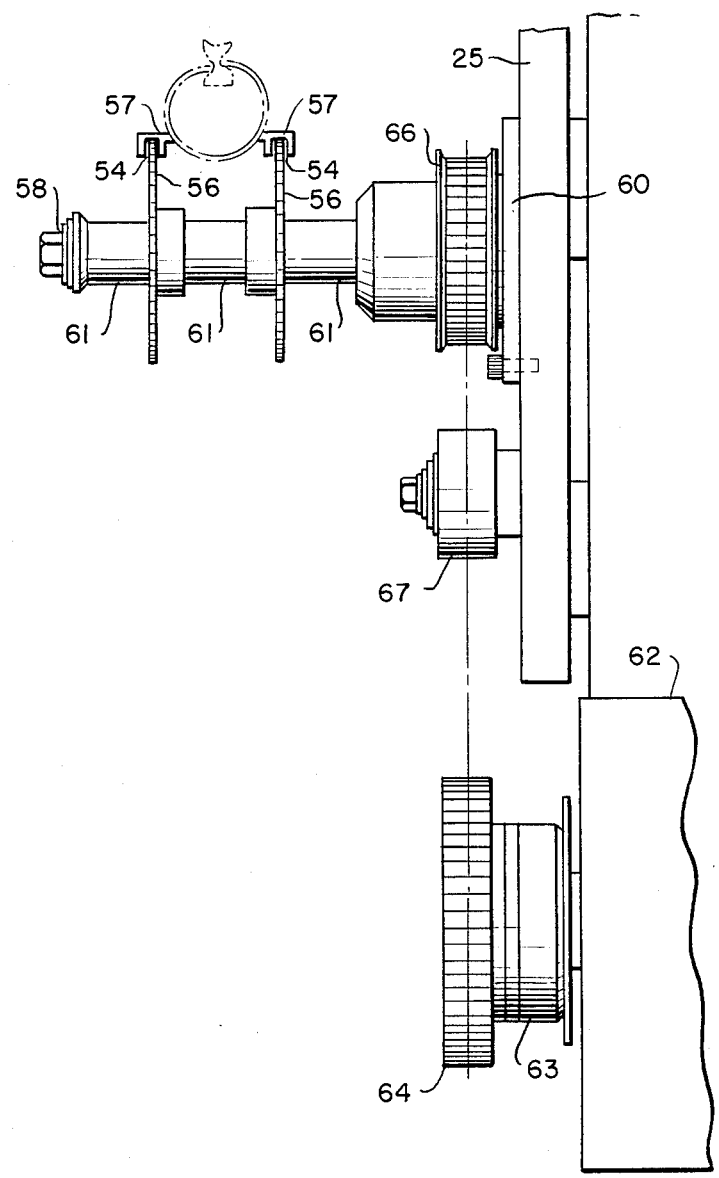
FIG. 17 is a right end view of the indexer assembly shown in FIG. 16.

The advancing means 4 for successively advancing the generally tubular shaped sheets of metal 2 from the roll former 3 to the first position 5 in a direction toward the laser welding apparatus 6 comprises a pair of chains 54 extending between the roll former and the first position about respective pairs of sprockets 55 and 56 as illustrated in FIGS. 16 and 17. Each of the endless chains 54 has a plurality of fingers 57, three fingers in the disclosed embodiment as shown in FIG. 1, mounted thereon for engaging the respective trailing ends of successively generally tubular shaped sheets of metal to advance the sheets. Each of the pairs of sprockets 55 and 56 are supported on a shaft of the type illustrated at 58 in FIG. 17. The assemblies of the shafts and sprockets 55 and 56 are respectively supported from the tooling plate 25 by means of support brackets 59 and 60. The sprockets 55 and 56 are spaced apart on the respective shafts 58 by means of spacers 61 so that the chains 54 are positioned on opposite sides of the generally tubular shaped sheets of metal 2. The sprockets 55 for the chains 54 are idler sprockets and the sprockets 56 act as drive sprockets. The sprockets 56 are nonrotatably connected to the shaft 58 which in turn is driven by the output of an indexer 62 through an overload clutch 63, sprocket 64, toothed belt 65 and sprocket 66 connected to the shaft 58. A takeup roller 67 is provided to tension the belt 65.

A series of vertically aligned, spaced apart holes such as those shown at 68 and 69 are provided in the tooling plate 25 to adjust the position of the idler sprockets 55 and drive sprockets 56 upward and downward with respect to the catch bar 30 of the roll former to accommodate different sizes of generally tubular shaped sheets of metal. The distance between respective idler sprockets 55 and between respective drive sprockets 56 can be adjusted by changing the size of the spacers 61. The roll former 3 is mounted on a subframe of the machine on slides 69 which permit adjustment of the position of the roll former in the direction of the movement of the generally tubular shaped sheets of metal 2. Thus, with different lengths of sheet metal, the roll former can be adjusted with respect to the advancing means 4 so that the trailing ends of the metal sheets are always positioned at the same point 70 along the advancing means.

These features of the present invention are particularly advantageous in that they permit the apparatus to continuously form and weld can bodies for the full range of sizes of three-piece cans recognized by the Can Manufacturers Institute. That is, can bodies can be formed and welded with can diameters ranging from 1 12/16 to 6 10/16 inches and with can lengths or heights ranging of from 2 14/16 or shorter to 7 inches in the case of sanitary cans for food or pharmaceuticals, for example. The apparatus is also useful for forming and welding a full range of standard aerosol cans which may be relatively small in diameter yet as tall as 9 8/16 inches.

The generally tubular shaped sheets of metal 2 are formed from flat sheets of metal having a thickness of 0.008 inch, for example, by the roll former 3 and delivered to the catch bar 30 of the roll former immediately over the advancing means 4 as illustrated in FIG. 18. In this position the generally cylindrical sheets of metal 2 are supported and guided by dish-shaped elements 71 extending beneath and along the sides of the metal sheet 2. The elements 71 are supported in a frame 72 shown schematically in FIG. 18 which, in turn, is carried by a support bracket 73 attached to the tooling plate 25. The frame 72 also supports guides 74 for the chains 54. In this position the fingers 57 on the chains 54 engage the lower portions of the sheet metal 2 on opposite sides thereof while the upper edges of the sheet metal are guided in the catch bar 30. As the sheet metal is advanced in the direction of the laser welding apparatus 6, the opposed edges are successively guided by the intermediate Z-bar 31 and the Z-bar 32 to the point of welding as discussed above. The frame 72 and the elements 71 therein extend along the apparatus in the direction of the laser welding apparatus to support and guide the sheets 2 from the roll former 3 up to a point adjacent the Z-bar 32 and an additional frame 93. The frame 93 contains a plurality of sets of support rollers 94 as shown in FIG. 5 spaced along the length of the frame 93 for supporting and guiding the sheets 2 so that the opposed edges thereof remain positioned in the guide channels of the Z-bar 32 as they are advanced by the additional advancing means 7.

Figure 19:
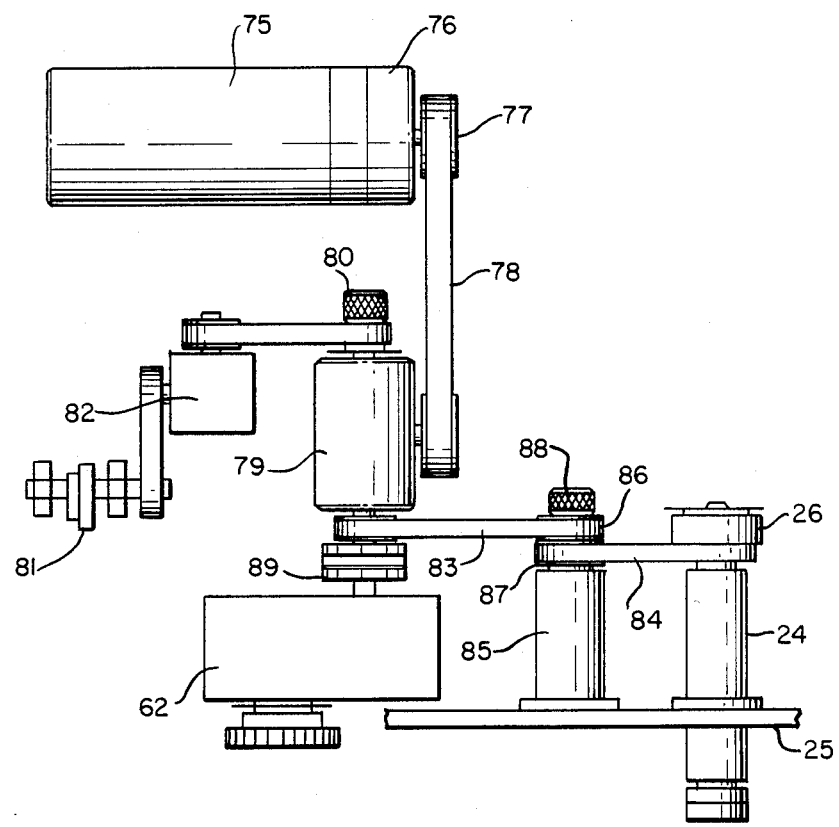
FIG. 19 is a schematic diagram of a drive for the apparatus according to the invention.

A single drive motor 75 shown in FIG. 19 is used to operate the apparatus 1. The drive motor is a variable speed motor which is connected through a clutch/brake 76 to a driving sprocket 77 to a toothed belt 78. The belt 78 drives the input of a speed reducing gearbox 79. The output from one side of the gearbox 79 is connected to the roll former eccentric 81 by way of a gearbox 82. A phase adjustor 80 is provided at this output of the gearbox 79. The output from the other side of the gearbox 79 is coupled, on the one hand, to the driveshaft 24 for the metal belts 8 and 9 by way of overload clutch 26, toothed belt 84, sprockets 86 and 87 on idler shaft 85, phase adjustor 88 and toothed belt 83 as illustrated in FIG. 19. On the other hand, this second output of the gearbox 79 is connected to the indexer 62 by way of a flexible coupling 89. The phase adjustor 80 permits the operation of the roll former eccentric to be adjusted with respect to the advancing means 4 so that a generally tubular shaped sheet of metal arrives at the catch bar 30 with its trailing end at point 70 in advace of the fingers 57 on the chains 54 which are to advance the metal sheet. Similarly, the phase adjustor 88 permits coordination between the position of the fingers 11 on the metal belts 8 and 9 and the fingers 57 on the chains 54 so that when the fingers 57 advance the trailing ends of the can bodies 2 to the first position 5, a pair of fingers 11 are just slightly upstream of this position 5 so that they move into contact with the upper portion of the generally tubular shaped sheet of metal while it is still moving to continue to advance the same toward the laser welding apparatus.

Figure 21:
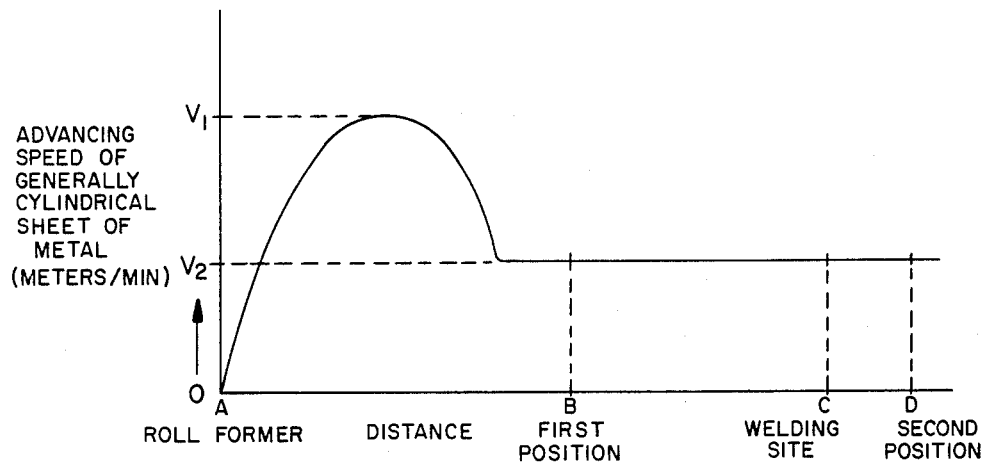
FIG. 21 is a graph showing the speed of a generally tubular shaped sheet of metal as it is moved along the apparatus of FIG. 1.

This movement is illustrated in FIG. 21 wherein the speed of a generally tubular shaped sheet of metal 2 is shown as a function of its distance of travel along the apparatus from the roll former 3 identified as point A, through first position 5 indicated by B, welding site C and second position 10 denoted by D. From the roll former 3 at position A the advancing means 4 accelerates the sheet metal 2 to a relatively high velocity $V_1$ over a short distance and then decelerates the sheet metal to a lower, substantially constant velocity $V_2$ as the sheet metal approaches the first position B. The metal belts 8 and 9 are moving at a speed $V_2$, such as 60 meters/minute, and the position of the fingers 11 thereon is coordinated with respect to the operation of the indexer 62 so that the fingers 11 arrive just after the trailing ends of the sheets of metal reach the position B so that the sheets are continuously advanced further along the apparatus at the speed $V_2$ through the welding station C to the second position 10 at D. From this point a conventional conveyor can be used to further process the welded can bodies. The high velocity $V_1$ during a portion of the travel of the sheet of metal 2 from the roll former 3 to the first position 5 identified as B in FIG. 21 is employed to reduce the spacing between successive sheets of metal 2 to a predetermined, small distance to enhance the production efficiency of the apparatus. The longitudinal spacing of the fingers along the respective belts 8 and 9 is dictated by the amount of this predetermined clearance and the height or length of the metal sheets 2.

Figure 20:
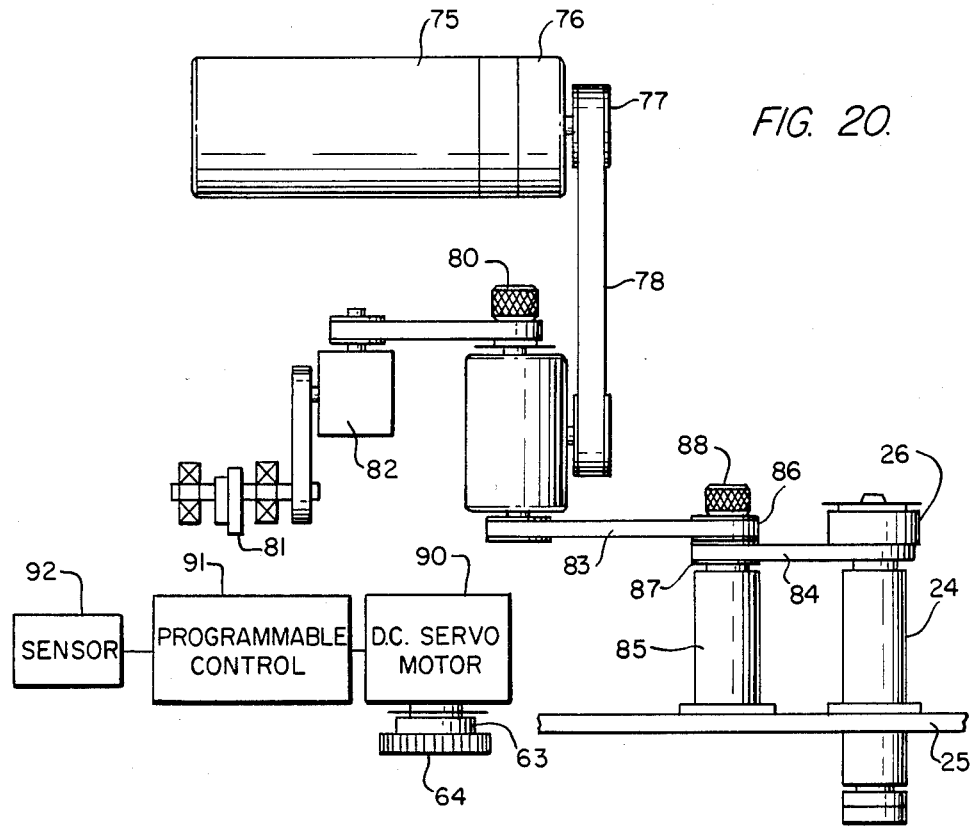
FIG. 20 is a schematic diagram of a drive similar to that shown in FIG. 19 but with the use of a D.C. servomotor in place of a cam operated indexer.

The indexer 62 is a cam type indexer. The velocity characteristic of this type of indexer is controlled by the shape of a cam. This necessitates changing cams if different velocity characteristics are desired. The time and expense associated with stocking a plurality of cams and changing the cams in such an indexer to vary the velocity characteristic can be avoided according to the form of the invention illustrated in FIG. 20 wherein the drive is similar to that illustrated in FIG. 19 except that a D.C. servomotor 90 is used as the indexer. A programable control 91 is provided for the D.C. servomotor 90 to permit a wide variation of the characteristics for indexing. Coordination between the advancing means 4 and the additional advancing means 7 can be obtained in this case by using a sensor 92 such as a light source and cooperating photocell to sense the position of the fingers 11 on the metal belts 8 at a predetermined location. With this information the D.C. servomotor 90 can be actuated by the control 91 at the appropriate time for coordinated movement.

While I have shown and described only one embodiment in accordance with the present invention, it is understood that the same is not limited thereto, but is susceptible to numerous changes and modifications as known to those skilled in the art. For example, the additional advancing means 7 including the pair of metal belts 8 and 9 for accurately positioning the opposed edges to be welded with respect to each other in a longitudinal direction, may be used with different types of welding apparatus such as electrical resistance welding apparatus or arc welding apparatus instead of laser welding apparatus. The additional advancing means 7 could also be operated at a variable speed rather than at a constant speed depending upon the desired sequencing of successive can bodies and the welding requirements. Reciprocating pistons or push rods, or metal belts could be used in place of the chains 54 of the advancing means 4 to index the metal sheets 2 from the roll former 3 to the first position. Further, instead of generally tubular shaped sheets, the apparatus could be used to advance and weld the edges of separate workpieces, such as flat workpieces whose edges are guided into position for welding by way of one or more Z-bars. In such a case the relative vertical spacing between the advancing means 4 and additional advancing means 7 could be reduced, if necessary, and the respective fingers on each could be laterally spaced from one another at a distance sufficient to avoid interference. Therefore, I do not wish to be limited to the details shown and described herein, but intend to cover all such changes and modifications as are encompassed by the scope of the appended calims.

I claim:

1. Apparatus for continuously forming and laser welding can bodies and the like comprising forming means for successively forming flat sheets of metal into generally tubular shaped sheets of metal having longitudinally extending edges to be welded, advancing means for successively advancing said generally tubular shaped sheets of metal from said forming means to a first position in a direction toward a laser welding means such that said generally tubular shaped sheets of metal are individually engaged and driven by said advancing means from said forming means to said first position so as to be moving at a predetermined speed at said first position, additionally advancing means for continuously advancing the successive moving, generally tubular shaped sheets of metal from said first position to a second position without stopping and at a substantially constant speed, and laser welding means arranged for welding the longitudinally extending edges of the generally tubular shaped sheets of metal as they are advanced by said additional advancing means.

2. Apparatus according to claim 1, wherein said additional advancing means includes a pair of endless metal belts extending between said first and second positions, each of said belts having a plurality of fingers mounted thereon in spaced relationship for engaging the trailing ends of successive generally tubular shaped sheets of metal to advance said sheets.

3. Apparatus for continuously advancing and laser welding can bodies and the like comprising means for continuously advancing successive generally tubular shaped sheets of metal from a first position to a second position, said tubular shaped sheets of metal having longitudinally extending edges to be welded, and laser welding means arranged for welding the longitudinally extending edges of the generally tubular shaped sheets of metal as they are advanced by said means for continuously advancing, wherein said means for continuously advancing includes a pair of endless metal belts extending between said first and second positions, each of said belts being in the form of a thin continuous strip of metal having a plurality of fingers mounted thereon in spaced relationship for engaging the trailing ends of the successive generally tubular shaped sheets of metal to advance said sheets.

4. Apparatus according to claim 2 or 3, wherein means are provided for arranging the pair of metal belts in spaced relationship on opposite sides of the longitudinally extending edges to be welded.

5. Apparatus according to claim 4, wherein said means for arranging the metal belts in spaced relationship includes guide roll means and drive sprocket means for supporting and driving the respective belts in spaced relationship, the drive sprocket means being provided with a plurality of teeth on their outer surfaces for drivingly engaging in a series of holes formed in the respective belts.

6. Apparatus according to claim 5, wherein said holes formed in the belts for receiving the teeth on the driving sprocket means are rectangular in shape, the driving face of said teeth being flat for engaging a side of the rectangular holes to drive said belts.

7. Apparatus according to claim 5, wherein means are provided for resiliently biasing at least one guide roll means supporting each belt to tension the belts.

8. Apparatus according to claim 7, wherein guide bar means are provided under each belt between the guide roll means and the driving sprocket means to prevent vibrations and vertical movement of the belts during their travel.

9. Apparatus according to claim 8, wherein the guide bar means between the drive sprocket means and the adjacent guide roll means on the downstream side of the drive sprocket means includes stripper means adjacent the drive sprocket means for stripping the metal belts off the drive sprocket means.

10. Apparatus according to claim 9, wherein the stripper means are knife edges formed of a wear resistant material.

11. Apparatus according to claim 4, wherein means are provided for supporting and guiding the successive generally tubular shaped sheets of metal as they are advanced, and wherein said means for arranging the pair of metal belts in spaced relationship supports the belts so that they move between said first and second positions in paths essentially parallel to the paths of the respective portions of the successive sheets of metal which are engaged by the fingers on said belts.

12. Apparatus according to claim 4, wherein said metal belts are formed of stainless steel and have a thickness of from 0.005 to 0.020 inch.

13. Apparatus according to claim 4, wherein said fingers are connected to respective base plates, connecting means being provided for connecting the respective base plates to said metal belts.

14. Apparatus according to claim 13, wherein said connecting means connect each of said base plates to said belts at a single line along the length of said base plates which extends in a direction perpendicular to the direction of movement of said belts.

15. Apparatus according to claim 14, wherein said connecting means are rivets having caps which engage said belts, the surfaces of said caps in contact with said belts being arcuate.

16. Apparatus according to claim 15, wherein at least two rivets connect each base plate to a belt, said at least two rivets being arranged along said single connecting line.

17. Apparatus according to claim 13, wherein each of said base plates is formed within close tolerances to the same predetermined length and thickness.

18. Apparatus according to claim 17, wherein guide bar means are provided for supporting the outer surfaces of said base plates as they advance the generally tubular shaped metal bodies between said first and second positions.

19. Apparatus according to claim 13, wherein the surfaces of the fingers on the belts which cooperate to engage the trailing end of a generally tubular shaped sheet of metal and advance the same are match machined with respect to each other so that the edges of said sheet metal to be welded are precisely aligned with respect to each other.

20. Apparatus according to claim 15, wherein said fingers are formed of tool steel.

21. Apparatus according to claim 1, wherein said advancing means includes indexing means for repeatedly moving successive generally tubular shaped sheets of metal over at least the distance between said forming means and said first position.

22. Apparatus according to claim 21, wherein said indexing means includes a cam indexer.

23. Apparatus according to claim 21, wherein said indexing means includes a D.C. servo motor.

24. Apparatus according to claim 1, wherein said advancing means comprises a pair of endless chains extending between said forming means and said first position, each of said chains having a plurality of fingers mounted thereon for engaging the respective trailing ends of successive generally tubular shaped metal sheets to advance said sheets.

25. Apparatus according to claim 24, wherein means are provided for arranging said pair of chains in spaced relationship on opposite sides of the generally tubular shaped sheets of metal.

26. Apparatus according to claim 25, wherein said means for arranging said pair of chains includes a drive sprocket and an idler sprocket for each of said chains.

27. Apparatus according to claim 26, wherein means are provided for adjusting the spacing between the drive sprockets and the spacing between the idler sprockets and means are provided for adjusting the spacing between the forming means and each of said idler and drive sprockets, so that a wide range of sizes of generally tubular shaped sheets of metal can be advanced by the apparatus.

28. Apparatus according to claim 27, wherein means are provided for adjusting the position of said forming means with respect to said advancing means.

29. Apparatus for continuously advancing and laser welding workpieces having opposed longitudinally extending edges to be welded, comprising means for continuously advancing successive workpieces from a first position to a second position, and laser welding means arranged for welding the opposed longitudinally extending edges of said workpieces as they are advanced by said means for continuously advancing, wherein said means for continuously advancing includes a pair of endless metal belts extending between said first and second positions, each of said belts being in the form of a thin continuous strip of metal having a plurality of fingers mounted thereon in spaced relationship for engaging the trailing ends of the successive workpieces to advance said workpieces.

30. Apparatus for continuously advancing and laser welding workpieces having opposed longitudinally extending edges to be welded, comprising means for successively providing workpieces having opposed longitudinally extending edges to be welded, advancing means for successively advancing said workpieces from said means for successively providing to a first position in a direction toward a laser welding means such that said workpieces are moving at a predetermined speed at said first position, additional advancing means for continuously advancing the successive moving workpieces from said first position to a second position, said additional advancing means including a pair of endless metal belts extending between said first and second positions, each of said belts being in the form of a thin continuous strip of metal having a plurality of fingers mounted thereon in spaced relationship for engaging the trailing ends of the successive workpieces to advance said workpieces, and laser welding means arranged for welding the longitudinally extending edges of the workpieces as they are advanced by said additional advancing means.

31. Apparatus according to claim 3, wherein the thickness of said thin continuous strip of metal is between 0.005 and 0.020 inch.

32. Apparatus according to claim 29, wherein the thickness of said thin continuous strip of metal is between 0.005 and 0.020 inch.

33. Apparatus according to claim 30, wherein the thickness of said thin continuous strip of metal is between 0.005 and 0.020 inch.

34. Apparatus for continuously advancing and welding workpieces having opposed longitudinally extending edges to be welded, comprising means for continuously advancing successive workpieces from a first position to a second position, and welding means arranged for welding the opposed longitudinally extending edges of said workpieces as they are advanced by said means for continuously advancing, wherein said means for continuously advancing includes a pair of endless belts extending between said first and second positions, each of said belts being in the form of a thin continuous strip having a plurality of fingers mounted thereon in spaced relationship for engaging the trailing ends of the successive workpieces to advance said workpieces, and wherein said fingers are connected to respective base plates extending along said belts, connecting means being provided for connecting the respective base plates to said belts to mount said fingers on said belts.

35. Apparatus according to claim 34, wherein said connecting means connect each of said base plates to said belts at a single line along the length of said base plates which extends in a direction perpendicular to the direction of movement of said belts.

36. Apparatus according to claim 35, wherein said connecting means are rivets having caps which engage said belts, the surfaces of said caps in contact with said belts being arcuate.

37. Apparatus according to claim 36, wherein at least two rivets connect each base plate to a belt, said at least two rivets being arranged along said single connecting line.

38. Apparatus according to claim 34, wherein each of said base plates is formed within close tolerances to the same predetermined length and thickness.

39. Apparatus according to claim 38, wherein guide bar means are provided for supporting the outer surfaces of said base plates as they advance the workpieces between said first and second positions to limit the canting of said base plates on said belts about said connecting means.

40. Apparatus according to claim 34, wherein the surfaces of the fingers on the belts which cooperate to engage the trailing ends of workpieces and advance the same are match machined with respect to each other so that the edges of said workpieces to be welded are precisely aligned with respect to each other.

41. Apparatus according to claim 40, wherein said fingers are formed of tool steel.

42. Apparatus for continuously advancing and welding workpieces having opposed longitudinally extending edges to be welded, comprising means for continuously advancing successive workpieces from a first position to a second position, and welding means arranged for welding the opposed longitudinally extending edges of said workpieces as they are advanced by said means for continuously advancing, wherein said means for continuously advancing includes a pair of endless belts extending between said first and second positions, each of said belts being in the form of a thin continuous strip having a plurality of fingers mounted thereon in spaced relationship for engaging the trailing ends of the successive workpieces to advance said workpieces, and wherein means are provided for arranging the pair of belts in spaced relationship on opposite sides of the longitudinally extending edges to be welded, said means for arranging the belts in spaced relationship including guide roll means and drive sprocket means for supporting and driving the respective belts in spaced relationship, the drive sprocket mans being provided with a plurality of teeth on their outer surfaces for drivingly engaging in a series of holes formed in the respective belts.

43. Apparatus according to claim 42, wherein said holes formed in the belts for receiving the teeth on the driving sprocket means are rectangular in shape, the driving face of said teeth being flat for engaging a side of the rectangular holes to drive said belts.

44. Apparatus according to claim 42, wherein means are provided for resiliently biasing at least one guide roll means supporting each belt to tension the belts.

45. Apparatus according to claim 44, wherein guide bar means are provided under each belt between the guide roll means and the driving sprocket means to prevent vibrations and vertical movement of the belts during their travel.

46. Apparatus according to claim 45, wherein the guide bar means between the drive sprocket means and the adjacent guide roll means on the downstream side of the drive sprocket means includes stripper means adjacent the drive sprocket means for stripping the belts off the drive sprocket means.

47. Apparatus according to claim 46, wherein the stripper means are knife edges formed of a wear resistant material.

48. Apparatus for continuously advancing and welding workpieces having opposed longitudinally extending edges to be welded, comprising means for continuously advancing successive workpieces from a first position to a second position, and welding means arranged for welding the opposed longitudinally extending edges of said workpieces as they are advanced by said means for continuously advancing, wherein said means for continuously advancing includes a pair of endless metal belts extending between said first and second positions, each of said belts being in the form of a thin continuous strip of metal having a thickness of from 0.005 to about 0.020 inch and having a plurality of fingers mounted thereon in spaced relationship for engaging the trailing ends of the successive workpieces to advance said workpieces.

49. Apparatus according to claim 48, wherein drive sprocket means are provided with a plurality of teeth on their outer surfaces for drivingly engaging in a series of holes formed in the respective belts.

50. Apparatus for continuously forming and laser welding workpieces in the form of flat sheets into workpieces in the form of generally tubular shaped sheets having longitudinally extending edges to be welded, advancing means for successively advancing the generally tubular shaped workpieces from said forming means to a first position in a direction toward a laser welding means such that said generally tubular shaped workpieces are individually engaged and driven by said advancing means from said forming means to said first position so as to be moving at a predetermined speed at said first position, additional advancing means for continuously advancing the successive moving, generally tubular shaped workpieces from said first position to a second position without stopping and at a substantially constant speed, and laser welding means arranged for welding the longitudinally extending edges of the generally tubular shaped workpieces as they are advanced by said additional advancing means.

* * * * *